United States Patent [19]

Sydansk

[11] Patent Number: 4,724,906

[45] Date of Patent: Feb. 16, 1988

[54] WELLBORE CEMENTING PROCESS USING A POLYMER GEL

[75] Inventor: Robert D. Sydansk, Littleton, Colo.

[73] Assignee: Marathon Oil Company, Findlay, Ohio

[21] Appl. No.: 945,730

[22] Filed: Dec. 22, 1986

[51] Int. Cl.$^4$ .................. E21B 33/14; E21B 33/138
[52] U.S. Cl. ........................ 166/295; 166/294; 166/300
[58] Field of Search ............... 166/270, 294, 295, 300; 405/264; 523/130, 132

[56] References Cited

U.S. PATENT DOCUMENTS

| | | | |
|---|---|---|---|
| Re. 32,114 | 4/1986 | Argabright et al. | 166/252 |
| 2,294,294 | 8/1942 | Grebe | 166/295 |
| 2,368,424 | 1/1945 | Reistle, Jr. | 166/295 X |
| 3,145,773 | 8/1964 | Jorda et al. | 166/295 X |
| 3,417,816 | 12/1968 | Morris et al. | 166/295 X |
| 3,511,313 | 5/1970 | Eilers et al. | 166/295 |
| 3,967,681 | 7/1976 | Curzon | 166/295 X |
| 4,606,407 | 8/1986 | Shu | 166/270 |
| 4,644,073 | 2/1987 | Mumallah et al. | 252/8.554 X |

OTHER PUBLICATIONS

*Basic Cementing*, Petroleum Publishing Co., 1977 (reprinted from a series of articles appearing in the Oil and Gas Journal).
Rike, J. L. et al., "Squeeze Cementing: State of the Art," Journal of Petroleum Technology, (Jan. 1982), pp. 37–45.
Shuttleworth and Russel, *Journal of the Society of Leather Trades' Chemists*, "The Kinetics of Chrome Tannage Part I.," U.K., 1965, v. 49, pp. 133–154; Part III., U.K., 1965, v. 49, pp. 251–260; Part IV., U.K., 1965, v. 49, pp. 261–268.
Von Erdman, *Das Leder*, "Condensation of Mononuclear Chromium (III) Salts to Polynuclear Compounds," Eduard Roether Verlag, Darmstadt, Germany, 1963, v. 14, p. 249.
Udy, Marvin J., *Chromium, vol. 1: Chemistry of Chromium and its Compounds*, Reinhold Publ. Corp., N.Y. 1956, pp. 229–233.
Cotton and Wilkinson, *Advanced Inorganic Chemistry* 3rd Ed., John Wiley & Sons, Inc., N.Y., 1972, pp. 836–839.

*Primary Examiner*—George A. Suchfield
*Attorney, Agent, or Firm*—Jack L. Hummel; Rodney F. Brown

[57] ABSTRACT

A volume in or near a wellbore penetrating a subterranean hydrocarbon-bearing formation is plugged using a cementing gel comprising a high molecular weight, water-soluble carboxylate-containing polymer and a chromic carboxylate complex crosslinking agent. The gel components are combined at the surface and injected into the volume via the wellbore to form a continuous single-phase gel therein.

27 Claims, No Drawings

WELLBORE CEMENTING PROCESS USING A POLYMER GEL

BACKGROUND OF THE INVENTION

1. Technical Field

The invention relates to a cementing process for oil field applications and more particularly to a wellbore cementing process wherein the wellbore penetrates a subterranean hydrocarbon-bearing formation.

2. Description of Related Art

Portland cement is commonly used in oil well cement jobs. Portland cements can be tailor-made for the specific conditions of each well. A description of the state of the art in oil well cementing technology is given in *Basic Cementing*, Petroleum Publishing Co., 1977 (reprinted from a series of articles appearing in the Oil and Gas Journal) and Rike, J. L., et al, *Squeeze Cementing: State of The Art*, Journal of Petroleum Technology, (January 1982), pp. 37-45.

Field practices for cementing are largely a product of trial and error by field personnel to meet irregularities in the cementing composition and the downhole environment. Cement quality control is difficult to achieve under such conditions. As a result, Portland cement jobs can result in premature set-up, cracking, or shrinking.

A cementing process is needed which employs a cement having a broad range of highly controllable and predictable set-up times and which economically provides ease of operation and design. A cementing process is needed which substitutes a cement for Portland cement in conventional cementing processes which is not as susceptible to shrinking and cracking.

SUMMARY OF THE INVENTION

The present invention provides a process for wellbore cementing. Wellbore cementing as used herein encompasses virtually all cementing processes employed in subterranean oil field applications including, but not limited to, completion of casing, filler, squeeze and plug cementing in production and injection wellbores. The process is particularly applicable to remedial squeeze cementing of oil and/or gas wellbores. Squeeze cementing is used specifically to repair holes in casing, to plug perforations, to seal liner tops, to reduce water-oil or water-gas ratios, to abandon formations, or the supplement or repair primary jobs.

The objectives of the present invention are achieved by means of a cement comprising a tailor-made crosslinked polymer gel. The gel contains a high molecular weight, water-soluble carboxylate-containing polymer and a chromic carboxylate complex crosslinking agent. The gel is prepared by forming a uniform gelation solution above ground containing the polymer and crosslinking agent, injecting the solution into the wellbore penetrating a hydrocarbon-bearing formation and conveying the solution by displacement or other means to a desired volume being plugged. The gelation solution may be advantageously designed to be at least partially gelled by the time it reaches the wellbore face to inhibit or prevent its propagation into a less permeable subterranean material, such as a formation matrix, which may adjoin the wellbore face where no plugging is desired. The gelation solution sets up in the desired subterranean volume without requiring the further injection of any additional components. The gel is a continuous single-phase material which substantially plugs the subterranean volume.

The desired subterranean volume depends on the particular wellbore cementing process being used. The volume may inter alia be the annulus between casing and a wellbore face, voids therebetween resulting from a primary cement job, an open wellbore, casing pinhole or thread leaks or any other volume in or adjacent the subterranean wellbore such as fractures, vugs, caverns, and wormholes near the wellbore. After the cement job, the well may be returned to normal operation.

The process provides distinct advantages over cementing processes known in the art. The gelation solution, as initially injected into the wellbore, is a uniform nonviscous liquid solution prepared at the surface which is substantially free of solids. The solid-free solution is more able to penetrate through microvoids and microannuluses in the wellbore than Portland cement slurries which contain suspended solids. This property of the solution provides good penetration, avoids bridging, and reduces fluid loss.

The resulting gel forms a tenacious chemical bond with the material of the wellbore face and/or tubular surfaced. It is sufficiently strong to substantially resist displacement from the plugged volume and is substantially permanent and resistant to in situ degradation. However, if subsequent removal of the gel is desired, it can be dissolved by an external solvent, such as solutions of sodium hypochlorite, hydrogen peroxide, or any other suitable peroxo compound.

The cementing gel employed in the present invention possesses a broad range of highly controllable and predictable set-up times and strengths. The process is applicable to a broad range of temperatures, salinites, rock formations, and environments. The practitioner can customize or tailor a gel for specific operational constraints, downhole characteristics and subsequent performence demands. One can predetermine the gelation rate and resultant gel strength and stability which are required of a gel to meet the performance demands in the wellbore. Thereafter, a cementing gel having the required predetermined properties is produced under controlled conditions at the surface by utilizing observed correlations between specific controllable gelation parameters and resultant gel properties.

DESCRIPTION OF THE PREFERRED EMBODIMENTS

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

"Gel" as used herein is directed to a continuous three-dimensional crosslinked polymeric network having an ultra high molecular weight. The gel contains a liquid medium such as water which is confined within the solid polymeric network. The fusion of a liquid and a solid component into a single-phase system provides the gel with a unique phase behavior. Gels employed by the present invention have sufficient structure so as not to propagate from the confines of a plugged volume into a less permeable region of the formation adjoining the volume when injected into the volume. "Plugging" is a substantial reduction in permeability of a volume in, adjacent, or near the wellbore.

"Partially gelled" solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer with the result that neither all of the polymer nor all of the crosslinking agent in the gelation solution is totally consumed by the crosslinking reaction. The partially gelled solution is capable of further crosslinking to completion resulting in the desired gel without the addition of more crosslinking agent.

"Crosslinked to completion" means that the gel composition is incapable of further crosslinking because one or both of the required reactants in the initial solution are consumed. Further crosslinking is only possible if either polymer, crosslinking agent, or both are added to the gel composition.

The gel composition utilized in the present invention is comprised of a carboxylate-containing polymer and a crosslinking agent. The carboxylate-containing polymer may be any crosslinkable, high molecular weight, water-soluble, synthetic polymer or biopolymer containing one or more carboxylate species. The average molecular weight of the carboxylate-containing polymer is in the range of about 10,000 to about 50,000,000 and preferably about 100,000 to about 20,000,000, and most preferably about 200,000 to about 15,000,000.

Biopolymers useful in the present invention include polysaccharides and modified polysaccharides. Examplary biopolymers are xanthan gum, guar gum, carboxymethylcellulose, o-carboxychitosans, hydroxyethylcellulose, hydroxypropylcellulose, and modified starches. Useful synthetic polymers include inter alia acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

The crosslinking agent is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes include:

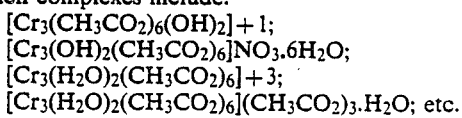

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists*, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compouds*, Reinhold Publishing Corp., N.Y., 1956, pp. 229-233; and Cotton and Wilkinson, *Advanced Inorganic Chemistry* 3rd Ed., John Wiley & Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

The gel is formed by admixing a carboxylate-containing polymer and crosslinking agent at the surface to form an injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. Exemplary starting materials include solid $CrA_3 \cdot H_2O$, solid $Cr_3Ac_7(OH)_2$ or a solution labeled "Chromic Acetate 50% Solution" commercially available, for example, from McGean Chemical Co., Inc., 1250 Terminal Tower, Cleveland, Ohio 44113, U.S.A.

The crosslinking agent solution is then mixed with an aqueous polymer solution to produce the gelation solution. Among other alternatives, the starting materials for the crosslinking agent can be dissolved directly in the aqueous polymer solution to form the gelation solution in a single step.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure although a solid-free gelation solution is preferred.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength is defined as the coherence of the gel network or resistance to deformation under external forces. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular cementing application is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing and quantitative viscosimetric analysis. The operable ranges of a number of gelation parameters and their correlation with the dependent variables are described below.

The lower temperature limit of the gelation solution at the surface is the freezing point of the solution and the upper limit is essentially the thermal stability limit of the polymer. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alkaline, i.e., greater than 7 to about 13. Increasing the pH within the prescribed range increases the rate of gelation.

The polymer concentration in the solution is about 500 ppm up to the solubility limit of the polymer in the solvent or the rheological constraints of the polymer solution, preferably about 1000 to about 200,000 ppm, and most preferably about 3000 to about 100,000. Increasing the polymer concentration increases the gelation rate and ultimate gel strength at a constant ratio of polymer to crosslinking agent.

The ionic strength of the solvent can be from that of deionized distilled water to that of a brine having an ion concentration approaching the solubility limit of the brine. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

Where an acrylamide polymer is employed, the degree of hydrolysis is about 0 to 60% and preferably about 0 to 30%. Within the preferred range, increasing the degree of hydrolysis increases the gelation rate. Increasing the molecular weight of the polymer increases the gel strength.

It is apparent from these correlations that one can produce gels across a very broad range of gelation rates and gel properties as a function of the gelation conditions. Thus, to effect an optimum cement job according to the present process, the practitioner predetermines the gelation rate and properties of the resultant gel which meet the demands of the given wellbore and thereafter produces the gel having these predetermined characteristics. The demands of the wellbore include the in situ gelation conditions such as temperature, connate water properties, size of the treatment volume, the pressure drop and permeability of the adjoining matrix as well as the post treatment conditions such as injection and production pressures. Analytical methods known to one skilled in the art are used to determine these demands which provide criteria to predetermine the gelation rate and resultant gel properties in the manner described above and continuing hereafter.

The gelation rate is advantageously sufficiently slow to enable preparation of the gelation solution at the surface, injection of the solution as a uniform slug into the wellbore, and displacement of the entire solution into the desired volumes to be plugged. Too rapid a gelation rate produces excessive gelation of the solution at the surface which results in a solution that may be difficult, if not impossible, to inject into the wellbore or volume to be plugged due to its rheological properties. At the same time, the gelation rate must be sufficiently rapid to enable completion of the reaction within a reasonable period of time so that the well may be activated after the cement job.

The solution may be substantially ungelled before reaching the wellbore face. However, at least partial gelation of the solution may be advantageous before the solution reaches the wellbore face bounding the permeable matrix or non-reservoir rock above or below the hydrocarbon-bearing formation and the volume being plugged. Partial gelation prevents the solution from penetrating other such material as well as the volume. Substantial penetration of such material by the solution and its ensuing permeability reduction are counterproductive to the plugging of wellbore volumes. The solution advantageously gels to completion in the desired volume. The values of the independent variables in the process are carefully selected to achieve a gelation rate meeting these criteria.

The amount of solution injected into the formation is a function of the size and location of the volume to be plugged. One skilled in the art can determine the required amount of a gel for a given volume to be plugged. Placement of the gelation solution in the wellbore volume may be facilitated by zone isolation means such as packers and the like.

The injection rate is a function of the gelation rate and operational constraints of injection pressure and pumping limits. The required injection rate is fixed such that all of the solution can be practically injected into the volume before it becomes unpumpable. The gelation time of the gel ranges from near instantaneous up to 48 hours or longer. Longer gelation times are limited by practical considerations of lost production when injection and production wells are shut in.

Gels having a predetermined gelation rate and resultant gel properties to meet the demands of a given well are produced by adjusting and setting the surface gelation conditions as they correlate to the gelation rate and gel properties. Accordingly, the gels are produced in a manner which renders them insensitive to most extreme formatio conditions. The gels can be stable at formation temperatures as high as 130° C. or more and at any formation pH contemplated. The gels are relatively insensitive to the stratigraphy of the rock, metal tubulars and other materials and chemicals employed in cementing operations. The gels can be employed in carbonate and sandstone strata and unconsolidated or consolidated strata having varying mineralogy. Once the gels are in place, it is extremely difficult to displace the gels by physical or chemical means other than total destruction of the crosslinked network. The gels may be reversible on contact with a solvent, such as hydrogen peroxide or sodium hypochlorite, but are substantially insoluble in the formation fluids.

The process is applicable to most oil field applications where Portland cement is presently used, simply by substituting the cementing gel for the Portland cement and selecting the gelation conditions in the manner described herein. The process is advantageously employed as a squeeze-cementing process and most advantageously as a remedial squeeze-cementing process. The strength of the gel can vary from an elastic jelly-like material to a rigid rubber-like material. The stronger materials are generally preferred where extreme drawdown pressures are encountered during production of a well or where extreme injection pressures are encountered during injection of fluids into a well which could cause a weak cement to fail. PA is often preferred for such formulations because it has a slower gelation rate than PHPA which enables one to inject it into a volume before it sets up.

The following examples demonstrate the practice and utility of the present invention but are not to be construed as limiting the scope thereof.

Most of the examples are formatted as tables of data which describe the formulation and maturation of one or more gels. Each gel is represented in a table by a single experimental run. Data include the conditions for producing the gel and the quantitative or qualitative strength of the produced gel. The tables display data in a three-tier format. The first tier is the values of the fixed gelation conditions which are constant and common to every run in the table. The second tier is values of the gelation conditions which vary among the different runs in the table but are constant for any given run. The third tier is the gel strength which varies as a function of time within each run. Qualitative gel strength is expressed in alphabetic code. Quantitative gel strength is simply the numerical value of apparent viscosity.

The following gel strength code and nomenclature are useful for interpreting the tables.

GEL STRENGTH CODE

A: No detectable continuous gel formed: the bulk of the solution appears to have the same viscosity as the original polymer solution although isolated local gel balls may be present.

B: Highly flowing gel: the gel appears to be only slightly more viscous than the initial polymer solution.

C: Flowing gel: most of the gel flows to the bottle cap by gravity upon inversion.

D: Moderately flowing gel: only a small portion (5-10%) of the gel does not readily flow to the bottle cap by gravity upon inversion (usually characterized as a tonguing gel).

E: Barely flowing gel: the gel can barely flow to the bottle cap and/or a significant portion (>15%) of the gel does not flow by gravity upon inversion.

F: Highly deformable nonflowing gel: the gel does not flow to the bottle cap by gravity upon inversion.

G: Moderately deformable nonflowing gel: the gel deforms about half way down the bottle by gravity upon inversion.

H: Slightly deformable nonflowing gel: only the gel surface slightly deforms by gravity upon inversion.

I: Rigid gel: there is no gel surface deformation by gravity upon inversion.

J: Ringing rigid gel: a tuning fork-like mechanical vibration can be felt upon tapping the bottle.

| Nomenclature | |
|---|---|
| % Hydrolysis: | % of carboxylate groups on the acrylamide polymer based on the total number of acrylamide groups |
| Polymer MW: | average molecular weight of the acrylamide polymer |
| Polymer Conc: | acrylamide polymer concentration in the polymer solution (ppm) |
| Polymer Solvent: | aqueous solvent in the polymer solution |
| Polymer pH: | pH of the polymer solution |
| Total Ion Conc: | total concentration of chromium III and acetate ions in the gelation solution (ppm) |
| Weight Ratio Polymer:Ions: | weight ratio of acrylamide polymer to chromium III and acetate ions in the gelation solution |
| Metal Ion Conc: | chromium III ion concentration in the gelation solution |
| Temp: | gelation temperature (°C.) |
| Time: | gelation time (hr) |
| Gel Code: | gel strength code |
| Viscosity: | apparent viscosity of the gelation solution (cp) |
| Pressure: | viscometer pressure (kPa) |

The polymer solutions of the following examples are prepared by diluting aqueous acrylamide polymer solutions with an aqueous solvent. Where qualitative data are obtained, the dilute polymer solution is combined with a crosslinking agent solution in a 0.12 liter widemouth bottle to form a 0.05 liter sample. The sample is gelled in the capped bottle and the qualitative gel strength is determined by periodically inverting the bottle.

Where quantitative data are obtained, the polymer solution and crosslinking agent solution are combined in a variable pressure and temperature rheometer (viscometer), having an oscillatory mode of 0.1 rad/sec and 100% strain. The apparent viscosity at a shear rate of about 0.1 sec$^{-1}$ is recorded as a function of time.

In all of the examples, the crosslinking agent solution is that used in the present invention (i.e., a complex or mixture of complexes comprised of chromium III and acetate ions). The crosslinking agent solution of the present invention is prepared by dissolving solid $CrAc_3 \cdot H_2O$ or $CrAc_7(OH)_2$ in water or diluting a solution obtained commercially under the label of "Chromic Acetate 50% Solution".

EXAMPLE 1

An artificial leak is created in the casing of an Illinois injection well having a total depth of 244 m. The leak is created by perforating the casing, originally having good integrity, with two holes 180° from each other at a depth of 238 m into a shaly sand formation. The resulting water leakoff rate for the water-filled casing is 117 kPa in 30 minutes for a 1380 kPa wellhead pressure, an unacceptable leakoff rate. The well is squeezed with 719 liters of a 2.0 wt% solution of 11,000,000 MW PA in fresh water crosslinked with a chromic acetate complex at a PA:complex weight ratio of 20:1. After shutting in the well for three days and allowing the gel to age at about 18° to 20° C., the excess gel is removed from the wellbore by use of a workover rig and a bailing tool. After the remedial squeeze-cementing treatment, no leakoff (i.e., less than 6.9 kPa) is detected in 30 minutes for a 2415 kPa wellhead pressure applied to the casing filled with water, a more than satisfactory leakoff rate. The excess gel is easily degraded to a watery solution using an 8% sodium hypochlorite solution.

EXAMPLE 2

An Illinois injection well with an actual casing leak between 152 and 183 m depth is treated in a similar manner as Example 1. Water leakoff is greater than 690 kPa in 30 minutes for a 1380 kPa wellhead pressure. 757 liters of gel identical to the gel of Example 1 is used to squeeze the interval. Excess gel is removed from the casing and degraded in a similar manner as Example 1. After the remedial squeeze-cementing treatment, no leakoff (i.e., less than 6.9 kPa) can be detected in 30 minutes for a 6900 kPa wellhead pressure applied to the casing filled with water.

EXAMPLE 3

| | | | | % Hydrolysis: 30 Polymer MW: 5,000,000 Polymer Conc: 8350 Polymer Solvent: 5,000 ppm NaCl in aqueous solution Polymer pH: 10.6 | | | | | |
|---|---|---|---|---|---|---|---|---|---|
| Run Number | 1 | 2 | 3 | 4 | 5 | 6 | 7 | 8 | 9 |
| Metal Ion Conc | 52 | 105 | 210 | 420 | 630 | 105 | 210 | 420 | 630 |
| Total Ion Conc | 250 | 500 | 1000 | 2000 | 3000 | 500 | 1000 | 2000 | 3000 |
| Weight Ratio Polymer:Ions | 33 | 16.7 | 8.4 | 4.2 | 2.8 | 16.7 | 8.4 | 4.2 | 2.8 |
| Temp | 22 | 22 | 22 | 22 | 22 | 60 | 60 | 60 | 60 |
| Time | | | | | Gel Code | | | | |
| 0.5 | A | A | A | A | A | B | B | C | C |
| 1.0 | A | A | A | A | A | C | C | D | E |
| 1.5 | A | A | A | A | A | D | E | G | H |
| 2.0 | B | B | B | B | B | E | F | H | I |
| 4.0 | B | B | B | C | D | G | G | H | I |
| 8.0 | B | B | C | D | E | G | H | I | J |
| 24 | D | E | E | F | H | G | H | I | J |
| 48 | E | E | E | G | I | G | H | I | J |
| 80 | G | G | G | H | I | G | H | I | J |
| 168 | G | G | H | I | J | G | I | J | J |
| 2040 | G | G | H | I | J | G | I | J | J |

The data show that gelation rate and gel strength increase as the temperature increases and as the weight ratio of polymer to ions decreases.

EXAMPLE 4

| | | | | % Hydrolysis: 30 Polymer MW: 5,000,000 Polymer Conc: 8350 Polymer Solvent: 5,000 ppm NaCl in aqueous solution Temp: 22 | | | | | | |
|---|---|---|---|---|---|---|---|---|---|---|
| Run Number | 1 | 2 | 3 | 4 | 5 | 6 | 7 | 8 | 9 | 10 |
| Polymer pH | 10.6 | 10.6 | 10.6 | 10.6 | 8.0 | 8.0 | 8.0 | 8.0 | 7.0 | 7.0 |
| Metal Ion Conc | 105 | 210 | 420 | 630 | 105 | 210 | 420 | 630 | 105 | 210 |
| Total Ion Conc | 500 | 1000 | 2000 | 3000 | 500 | 1000 | 2000 | 3000 | 500 | 1000 |
| Weight Ratio Polymer:Ions | 16.7 | 8.4 | 4.2 | 2.8 | 16.7 | 8.4 | 4.2 | 2.8 | 16.7 | 8.4 |
| Time | | | | | Gel Code | | | | | |
| 0.5 | A | A | A | A | A | A | A | A | A | A |
| 1.0 | A | A | A | A | A | A | A | A | A | A |
| 1.5 | A | A | A | A | A | A | A | A | A | A |

-continued

% Hydrolysis: 30
Polymer MW: 5,000,000
Polymer Conc: 8350
Polymer Solvent: 5,000 ppm NaCl in aqueous solution
Temp: 22

| 2.0 | B | B | B | B | A | A | A | A | A | A |
|---|---|---|---|---|---|---|---|---|---|---|
| 2.5 | B | B | B | B | A | A | A | A | A | A |
| 4.0 | B | B | C | D | A | B | B | B | A | A |
| 5.0 | B | C | D | D | A | B | B | B | A | A |
| 6.0 | B | C | D | E | A | B | B | B | A | B |
| 7.0 | B | C | D | E | A | B | B | B | A | B |
| 8.0 | B | C | D | E | B | B | B | B | B | B |
| 24 | E | E | F | G | B | B | B | C | B | C |
| 28 | E | E | G | I | B | B | B | C | B | C |
| 48 | E | E | G | I | B | B | B | C | B | C |
| 80 | G | G | H | I | B | C | C | G | B | C |
| 168 | G | H | I | J | C | E | G | H | B | D |
| 2040 | G | H | I | J | E | E | G | — | E | F |

| Run Number | 11 | 12 | 13 | 14 | 15 | 16 | 17 | 18 | 19 | 20 |
|---|---|---|---|---|---|---|---|---|---|---|
| Polymer pH | 7.0 | 7.0 | 6.0 | 6.0 | 6.0 | 6.0 | 4.0 | 4.0 | 4.0 | 4.0 |
| Metal Ion Conc | 420 | 630 | 105 | 210 | 420 | 630 | 105 | 210 | 420 | 630 |
| Total Ion Conc | 2000 | 3000 | 500 | 1000 | 2000 | 3000 | 500 | 1000 | 2000 | 3000 |
| Weight Ratio Polymer:Ions | 4.2 | 2.8 | 16.7 | 8.4 | 4.2 | 2.8 | 16.7 | 8.4 | 4.2 | 2.8 |
| Time | | | | | Gel Code | | | | | |
| 0.5 | A | A | A | A | A | A | A | A | A | A |
| 1.0 | A | A | A | A | A | A | A | A | A | A |
| 1.5 | A | A | A | A | A | A | A | A | A | A |
| 2.0 | A | A | A | A | A | B | A | A | A | B |
| 2.5 | A | A | A | A | A | A | A | A | A | B |
| 4.0 | A | A | A | A | B | B | A | A | A | B |
| 5.0 | B | B | A | A | B | B | A | A | B | B |
| 6.0 | B | B | A | A | B | B | A | A | B | C |
| 7.0 | B | B | A | B | B | B | A | A | B | C |
| 8.0 | B | B | B | B | B | B | A | B | B | C |
| 24 | C | C | B | B | C | C | B | C | D | D |
| 28 | D | E | B | C | D | F | B | C | D | D |
| 48 | D | E | B | C | D | F | B | C | D | E |
| 80 | D | E | B | C | D | F | B | C | F | G |
| 168 | E | H | D | D | E | G | B | D | G | I |
| 2040 | G | — | E | F | G | — | D | G | — | — |

The data show that gelation rate and gel strength decrease as pH of the polymer solution decreases.

EXAMPLE 5

% Hydrolysis: <1
Polymer MW: 11,000,000
Polymer Conc: 20,000
Polymer Solvent: Denver Tap Water
Temp: 60

| Run Number: | 1 | 2 | 3 |
|---|---|---|---|
| Weight Ratio Polymer:Ions | 40 | 20 | 10 |
| Time | | Viscosity | |
| 0.0 | 940,000 | 940,000 | 940,000 |
| 0.5 | 500,000 | 1,300,000 | 1,300,000 |
| 1.0 | 800,000 | 2,300,000 | 2,300,000 |
| 2.0 | 1,100,000 | 2,800,000 | 3,500,000 |
| 4.0 | 1,200,000 | 3,200,000 | 4,300,000 |
| 8.0 | 1,300,000 | 3,400,000 | 4,700,000 |
| 12 | 1,300,000 | 3,400,000 | 4,700,000 |
| 16 | 1,400,000 | 3,400,000 | 4,700,000 |
| 20 | 1,400,000 | 3,400,000 | 4,700,000 |

Viscosity data confirm the observations of Examples 3 and 4 that decreasing the weight ratio of polymer to ions increases the gelation rate.

The mature gel of Run 2 exhibits properties of a Bingham plastic. Its yield stress is determined by attempting to flow the gel through a 1.4 mm diameter orifice at an applied pressure. The gel does not flow through the orifice at applied pressures up to 3450 kPa for tests conducted at two different temperatures, 22° C. and 104° C.

EXAMPLE 6

% Hydrolysis: <1
Polymer MW: 11,000,000
Polymer Conc: 20,000
Polymer Solvent: Denver Tap Water
Weight Ratio Polymer:Ions: 20

| Run Number | 1 | 2 | 3 |
|---|---|---|---|
| Temp | 23 | 43 | 60 |
| Time | | Viscosity | |
| 0.0 | 50,000 | 50,000 | 50,000 |
| 0.2 | 50,000 | 50,000 | 875,000 |
| 0.5 | 50,000 | 100,000 | 1,400,000 |
| 1.0 | 60,000 | 200,000 | 2,250,000 |
| 2.0 | 75,000 | 600,000 | 2,900,000 |
| 4.0 | 100,000 | 1,125,000 | 3,275,000 |
| 8.0 | 125,000 | 1,800,000 | 3,400,000 |
| 12 | 175,000 | 2,100,000 | 3,425,000 |
| 16 | 200,000 | 2,300,000 | 3,425,000 |
| 20 | 300,000 | 2,500,000 | 3,425,000 |

Viscosity data confirm that increasing the temperature increases the gelation rate.

EXAMPLE 7

| | % Hydrolysis: <1 | | |
|---|---|---|---|
| | Polymer MW: 11,000,000 | | |
| | Polymer Conc: 20,000 | | |
| | Polymer Solvent: Denver Tap Water | | |
| | Weight Ratio Polymer:Ions: 20 | | |
| | Temp: 60 | | |
| Run Number: | 1 | 2 | 3 |
| Pressure | 690 | 3450 | 6900 |
| Time | | Viscosity | |
| 0.0 | 91,000 | 91,000 | 91,000 |
| 0.2 | 250,000 | 800,000 | 250,000 |
| 0.5 | 800,000 | 1,400,000 | 800,000 |
| 1.0 | 1,700,000 | 2,200,000 | 2,000,000 |
| 2.0 | 2,300,000 | 2,800,000 | 2,700,000 |
| 3.0 | 2,500,000 | 3,200,000 | 3,200,000 |
| 4.0 | 2,700,000 | 3,300,000 | 3,400,000 |
| 8.0 | 2,750,000 | 3,400,000 | 3,500,000 |
| 12 | 2,800,000 | 3,400,000 | 3,500,000 |
| 16 | 2,800,000 | 3,400,000 | 3,500,000 |
| 20 | 2,800,000 | 3,400,000 | 3,500,000 |

Viscosity data show that gelation rate is a weak function of pressure. The rate increases slightly with pressure.

EXAMPLE 8

| | Polymer MW: 5,000,000 | |
|---|---|---|
| | Polymer Conc: 10,000 | |
| | Polymer Solvent: Denver Tap Water | |
| | Polymer pH: 8.0 | |
| | Temp: 22 | |
| | Metal Ion Conc: 207 | |
| | Total Ion Conc: 990 | |
| | Weight Ratio Polymer:Ions: 10.0 | |
| Run Number | 1 | 2 |
| % Hydrolysis | 30 | <1 |
| Time | Gel Code | |
| 0.25 | B | A |
| 2.0 | B | A |
| 3.0 | C | A |
| 4.0 | C | A |
| 5.0 | C | B |
| 8.0 | E | B |
| 23 | F | B |
| 48 | E | B |
| 72 | F | B |
| 103 | F | B |
| 268 | G | B |

The data show that the rate of gelation of partially hydrolyzed polyacrylamide is considerably faster than that of substantially unhydrolyzed polyacrylamide. Thus, the gelation rate of an acrylamide polymer solution can be slowed by reducing the degree of hydrolysis of the acrylamide groups.

EXAMPLE 9

| | Polymer MW: 11,000,000 | |
|---|---|---|
| | Polymer Conc: 12,500 | |
| | Polymer Solvent: Denver Tap Water | |
| | Temp: 40 | |
| | Weight Ratio Polymer:Ions: 20 | |
| | Pressure: 3450 | |
| Run Number | 1 | 2 |
| % Hydrolysis | 30 | <1 |
| Polymer pH | 10 | 9 |
| Time | Viscosity | |
| 0 | 190,000 | 8,000 |
| 0.1 | 255,000 | 10,000 |
| 0.5 | 300,000 | 15,000 |
| 1 | 350,000 | 25,000 |
| 2 | 415,000 | 40,000 |
| 3 | 460,000 | 70,000 |
| 4 | 500,000 | 100,000 |
| 8 | 575,000 | 210,000 |
| 11 | 600,000 | 300,000 |
| 14 | 605,000 | 355,000 |
| 18 | 605,000 | 425,000 |
| 20 | 605,000 | 460,000 |
| 36 | 605,000 | 610,000 |

Viscosity data confirm the observations of Example 8.

EXAMPLE 10

| | % Hydrolysis: <1 | | | | | | | |
|---|---|---|---|---|---|---|---|---|
| | Polymer MW: 5,000,000 | | | | | | | |
| | Polymer Conc: 20,000 | | | | | | | |
| | Polymer Solvent: Denver Tap Water | | | | | | | |
| | Polymer pH: 8.8 | | | | | | | |
| Run Number | 1 | 2 | 3 | 4 | 5 | 6 | 7 | 8 |
| Metal Ion Conc | 404 | 206 | 104 | 52.2 | 404 | 206 | 104 | 52.2 |
| Total Ion Conc | 1420 | 980 | 495 | 244 | 1920 | 980 | 495 | 249 |
| Weight Ratio Polymer:Ions | 10 | 20 | 40 | 80 | 10 | 20 | 40 | 80 |
| Temp | 22 | 22 | 22 | 22 | 60 | 60 | 60 | 60 |
| Time | | | | Gel Code | | | | |
| 0.5 | A | A | A | A | B | B | A | A |
| 1.0 | A | A | B | B | G | G | F | C |
| 2.0 | A | A | B | B | I | I | I | I |
| 3.0 | B | B | B | B | J | J | J | J |
| 5.0 | B | B | B | B | J | J | J | J |
| 6.0 | C | C | C | C | J | J | J | J |
| 7.0 | E | E | E | E | J | J | J | J |
| 8.0 | G | G | F | F | J | J | J | J |
| 25 | H | H | H | H | J | J | J | J |
| 48 | H | H | H | H | J | J | J | J |
| 96 | I | I | I | I | J | J | J | J |
| 120 | I | I | I | I | J | J | J | J |
| 144 | J | J | J | J | J | J | J | J |
| 1032 | J | J | J | J | J | — | — | — |

The data show that there is a functional relation between gelation rate and temperature for polyacrylamide gels as well as partially hydrolyzed polyacrylamide gels.

EXAMPLE 11

| | % Hydrolysis: 30 | | | | | |
|---|---|---|---|---|---|---|
| | Polymer MW: 5,000,000 | | | | | |
| | Polymer Solvent: Distilled Water | | | | | |
| | Polymer pH: 8.0 | | | | | |
| | Temp: 22 | | | | | |
| | Weight Ratio Polymer:Ions: 10 | | | | | |
| Run Number | 1 | 2 | 3 | 4 | 5 | 6 |
| Metal Ion Conc | 310 | 207 | 157 | 105 | 63 | 42 |
| Total Ion Conc | 1,480 | 990 | 747 | 499 | 300 | 200 |
| Polymer Conc | 15,000 | 10,000 | 7,500 | 5,000 | 3,000 | 2,000 |
| Time | | | Gel Code | | | |
| 0.25 | B | B | B | A | A | A |
| 0.5 | C | B | B | A | A | A |
| 1.0 | C | B | B | A | A | A |
| 2.0 | E | B | B | A | A | A |
| 3.0 | E | C | B | A | A | A |
| 4.0 | G | C | B | A | A | A |
| 5.0 | I | C | B | B | A | A |
| 8.0 | I | E | C | B | B | A |
| 23 | I | F | C | B | B | A |

-continued

| | | | | | | |
|---|---|---|---|---|---|---|
| 48 | I | F | C | C | B | A |
| 72 | I | G | D | C | B | A |
| 103 | I | G | F | C | B | B |
| 268 | I | H | F | D | C | B |

The data show that decreasing the polymer concentration while maintaining the same weight ratio of polymer to ions substantially decreases the gelation rate and gel strength, enabling one to produce a flowing gel.

EXAMPLE 12

| | | | |
|---|---|---|---|
| % Hydrolysis: <1 | | | |
| Polymer Solvent: Denver Tap Water | | | |
| Weight Ratio Polymer:Ions: 10 | | | |
| Temp: 60 | | | |
| Run Number | 1 | 2 | 3 |
| Polymer Conc | 30,000 | 20,000 | 15,000 |
| Time | | Viscosity | |
| 0.0 | 3,000 | 3,000 | 3,000 |
| 0.2 | 700,000 | 700,000 | 200,000 |
| 0.5 | 1,700,000 | 1,600,000 | 400,000 |
| 1.0 | 3,200,000 | 2,300,000 | 800,000 |
| 2.0 | 4,000,000 | 2,800,000 | 1,000,000 |
| 4.0 | 4,600,000 | 3,300,000 | 1,200,000 |
| 8.0 | 4,600,000 | 3,300,000 | 1,200,000 |
| 20 | 4,600,000 | 3,300,000 | 1,200,000 |

Viscosity data confirm the observations of Example 11 that gelation rate decreases as polymer concentration decreases.

EXAMPLE 13

| | | |
|---|---|---|
| % Hydrolysis: 30 | | |
| Polymer Conc: 3,000 | | |
| Polymer Solvent: 3,000 ppm NaCl in aqueous solution | | |
| Polymer pH: 10.1 | | |
| Temp: 22 | | |
| Metal Ion Conc: 155 | | |
| Total Ion Conc: 600 | | |
| Weight Ratio Polymer:Ions: 5.0 | | |
| Run Number | 1 | 2 |
| Polymer MW | 5,000,000 | 11,000,000 |
| Time | Gel Code | |
| 0.5 | A | A |
| 1.0 | A | B |
| 3.0 | A | B |
| 4.0 | B | C |
| 5.0 | B | E |
| 11 | B | E |
| 24 | C | F |
| 48 | C | G |
| 56 | D | G |
| 101 | D | G |
| 156 | E | G |
| 192 | E | G |
| 269 | F | G |

The data show that gelation rate and gel strength increase as the molecular weight of the polymer increases.

EXAMPLE 14

| | | |
|---|---|---|
| % Hydrolysis: <1 | | |
| Polymer Conc: 20,000 | | |
| Polymer Solvent: Denver Tap Water | | |
| Weight Ratio Polymer:Ions: 20 | | |
| Temp: 60 | | |
| Run Number | 1 | 2 |
| Polymer MW | 5,000,000 | 11,000,000 |
| Time | Viscosity | |
| 0.0 | 100,000 | 100,000 |
| 0.5 | 300,000 | 1,400,000 |
| 1.0 | 800,000 | 2,200,000 |
| 2.0 | 1,300,000 | 2,800,000 |
| 4.0 | 1,800,000 | 3,200,000 |
| 6.0 | 2,000,000 | 3,300,000 |
| 8.0 | 2,100,000 | 3,400,000 |
| 12 | 2,200,000 | 3,400,000 |
| 16 | 2,200,000 | 3,400,000 |

Viscosity data confirm the observations of Example 13.

Examples 3–14 show that the gelation rate of the polymer and crosslinking agent of the present invention can be adjusted to any desired rate and gel strength by selecting the values of the independent variables such as polymer or crosslinking agent concentration, polymer molecular weight, temperature, pH, etc. This is particularly useful in customizing a gel for a specific cementing application.

Various salts and gases commonly found in oil field brines are added to the gelation solution of Examples 15 and 16 to determine the sensitivity of the gelation reaction to in situ fluids.

EXAMPLE 15

| | | | | |
|---|---|---|---|---|
| % Hydrolysis: 30 | | | | |
| Polymer MW: 5,000,000 | | | | |
| Polymer Conc: 8350 | | | | |
| Polymer pH: 9.6 | | | | |
| Temp: 22 | | | | |
| Metal Ion Conc: 259 | | | | |
| Total Ion Conc: 1,000 | | | | |
| Weight Ratio Polymer:Ions: 8.4 | | | | |
| Run Number | 1 | 2 | 3 | 4 |
| Polymer Solvent | fresh water | 3,000 ppm NaCl | 10,000 ppm NaCl | 29,200 ppm NaCl |
| Time | | Gel Code | | |
| 0.0 | B | B | B | B |
| 1.0 | B | C | D | D |
| 2.0 | B | C | D | D |
| 3.0 | B | D | D | D |
| 4.0 | B | D | D | D |
| 5.0 | B | E | E | E |
| 7.0 | B | E | E | E |
| 24 | D | F | F | F |
| 51 | G | G | G | G |
| 79 | I | I | I | I |
| 480 | I | I | I | I |

EXAMPLE 16

| | | | | | |
|---|---|---|---|---|---|
| % Hydrolysis: 30 | | | | | |
| Polymer MW: 5,000,000 | | | | | |
| Polymer Conc: 8350 ppm | | | | | |
| Polymer Solvent: 5,000 ppm NaCl in aqueous solution | | | | | |
| Polymer pH: 7.0 | | | | | |
| Temp: 22 | | | | | |
| Metal Ion Conc: 259 | | | | | |
| Total Ion Conc: 1000 | | | | | |
| Weight Ratio Polymer:Ions: 8.4 | | | | | |
| Run Number | 1 | 2 | 3 | 4 | 5 |
| Additive: | none (control) | $CO_2$ | $NaNO_3$ | $MgCl_2$ | $CaCl_2$ |
| Additive Conc (ppm): | — | saturated solution | 2000 | 2000 | 1000 |
| Time | | | Gel Code | | |
| 1.0 | A | A | A | A | A |

-continued

| | | | | | |
|---|---|---|---|---|---|
| 4.0 | A | A | A | A | A |
| 5.0 | B | B | B | B | B |
| 6.0 | B | B | B | B | B |
| 7.0 | B | B | B | B | B |
| 8.0 | C | C | C | C | C |
| 24 | C | C | C | C | C |
| 72 | D | D | C | D | D |
| 120 | E | E | E | E | E |
| 264 | E | E | E | E | F |
| 288 | E | E | E | E | F |
| 408 | E | E | E | E | F |

The data of Examples 15 and 16 show that the gelation reaction is relatively insensitive to these additives.

Examples 17–19 utilize actual or synthetic field injection waters in the gelation solutions.

EXAMPLE 17

% Hydrolysis: 30
Polymer MW: 11,000,000
Polymer Conc: 3000
Polymer Solvent: Synthetic Field Injection Water A*
Polymer pH: 10.4
Metal Ion Conc: 77.5
Total Ion Conc: 299
Weight Ratio Polymer:Ions: 10.0

| Run Number | 1 | 2 |
|---|---|---|
| Temp | 22 | 43** |
| Time | Gel Code | |
| 0.50 | B | B |
| 0.75 | C | C |
| 1.0 | C | D |
| 1.5 | C | D |
| 2.0 | D | E |
| 6.0 | D | E |
| 8.0 | E | E |
| 35 | F | F |
| 168 | F | F |
| 240 | G | F |
| 269 | G | G |
| 504 | G | G |

*Synthetic Field Injection Water A has the following composition:

| | g/l |
|---|---|
| CaSO4.H2O | 0.594 |
| MgSO4 | 0.788 |
| NaHCO3 | 1.53 |
| CaCl3 | 0.655 |
| Na2SO4 | 1.52 |
| K2SO4 | 0.452 |

**Temperature of Field A.

EXAMPLE 18

% Hydrolysis: 30
Polymer MW: 5,000,000
Polymer Solvent: Actual Field Injection Water B*
Temp: 60**

| Run Number | 1 | 2 | 3 | 4 |
|---|---|---|---|---|
| Polymer Conc | 3000 | 4000 | 5000 | 8000 |
| Polymer pH | 8.5 | 8.5 | 8.5 | 9.0 |
| Metal Ion Conc | 54.5 | 72.6 | 64.9 | 90.7 |
| Total Ion Conc | 240 | 320 | 286 | 399 |
| Weight Ratio Polymer:Ions | 12.5 | 12.5 | 17.5 | 20 |
| Time | Gel Code | | | |
| 0.5 | A | A | A | A |
| 1.0 | A | A | A | C |
| 1.5 | A | B | B | D |
| 2.0 | B | D | D | E |
| 3.0 | C | D | D | F |
| 4.0 | D | D | D | F |
| 5.0 | D | E | E | F |
| 12 | D | E | E | F |
| 27 | D | D | D | F |
| 504 | D | D | D | F |

*Actual Field Injection Water B has a TDS of 0.58%, H2S >100 ppm, and is comprised of the following primary ionic constituents:

| | ppm |
|---|---|
| Na+ | 252 |
| Mg2+ | 97 |
| Ca2+ | 501 |
| Cl− | 237 |
| SO42− | 1500 |
| HCO3− | 325 |

**Temperature of Field B.

EXAMPLE 19

% Hydrolysis: 30
Polymer Solvent: Synthetic Field Injection Water C*
Polymer pH: 7.5
Temp: 22**
Weight Ratio Polymer:Ions: 15

| Run Number | 1 | 2 | 3 |
|---|---|---|---|
| Polymer MW | 11,000,000 | 11,000,000 | 11,000,000 |
| Polymer Conc | 3,000 | 5,000 | 8,000 |
| Metal Ion Conc | 45.4 | 75.7 | 121 |
| Total Ion Conc | 200 | 333 | 533 |
| Time | Gel Code | | |
| 0.25 | A | A | A |
| 0.5 | A | A | B |
| 4.0 | A | A | B |
| 5.0 | A | A | C |
| 6.0 | A | B | C |
| 7.0 | A | C | D |
| 24 | B | D | D |
| 96 | C | D | G |
| 150 | D | D | G |
| 197 | D | D | H |
| 936 | D | D | H |

*Synthetic Field Injection Water C has the following composition

| | g/l |
|---|---|
| Na2CO3 | 0.249 |
| NH4Cl | 0.085 |
| CaCl2 | 0.821 |
| MgCl2.6H2O | 1.78 |
| Na2SO4 | 1.09 |
| NaCl | 4.80 |
| NaHCO3 | 2.09 |

**Temperature of Field C.

Examples 17–19 show that gels can be formulated in saline actual field waters. The concentration and proportions of gel components can be selected to form stable gels even in complex injection waters such as B and C at the formation temperature.

In Examples 20–22, the gelation solutions are physically modified during aging.

EXAMPLE 20

% Hydrolysis: 30
Polymer MW: 5,000,000
Polymer Conc: 5,000
Polymer Solvent: 3,000 ppm NaCl in aqueous solution
Polymer pH: 10.2
Temp: 22
Metal Ion Conc: 155
Total Ion Conc: 600
Weight Ratio Polymer:Ions: 8.3

| Run Number | 1 | 2 | 3 |
|---|---|---|---|
| Time | Gel Code | | |
| 1.0 | A | A | A |
| 1.5 | B | B | B |

-continued

| | | | |
|---|---|---|---|
| 4.0 | D | D | D |
| 17 | E | E | E |
| 24 | E | E | E |
| 96 | E | E | E |
| | Viscosity | | |
| 96 | 1400 | 2000 | 2300 |

The gel of Run 1 is aged without agitation. The gel of Run 2 is stirred after 1 hour of aging for 5 minutes at 1750 rpm with a 4 mm propeller in a 6 mm inside diameter bottle. The gel of Run 3 after 1 hour of aging is forced through a 10 cm long nylon tube 0.16 cm in diameter at a rate of 100 cc in 7.2 sec and a pressure drop of 410 kPa.

Example 20 shows that shearing the gelation solution after 1 hour of aging has very little negative impact on the strength of the final gel. This is an important property because the gelation solution can encounter shear forces during injection into voids present in the wellbore. The sheared solution matures to approximately the same final gel strength as the unsheared solution.

EXAMPLE 21

% Hydrolysis: 30
Polymer MW: 5,000,000
Polymer Conc: 5000
Polymer Solvent: 3000 ppm NaCl
Polymer pH: 10.2
Temp: 22
Metal Ion Conc: 155
Total Ion Conc: 600
Weight Ratio Polymer:Ions: 8.3

| Run Number | 1 |
|---|---|
| Time | Gel Code |
| 0.50 | A |
| 1.0 | A |
| 1.5 | A |
| 2.0 | A |
| 3.5 | B |
| 4.0 | B |
| 5.0 | B |
| 6.0 | B |
| 7.0 | C |
| 23.5 | D |
| 24.0 | D |
| 26.0 | D |
| 31.0 | E |
| 94 | F |
| 240 | F |

The 50 cc gelation solution is filtered through an 8 micron millipore cellulose-acetate filter at a filtration pressure of 345 kPa after 1 hour of aging. The diameter of the filter is 47 mm. Although the solution has no visually detectable gel formation, only 0.8 cc of the solution pass through the filter after 10 minutes. In comparison, a polymer solution absent the crosslinking agent is filtered according to the same procedure and the 50 cc sample passes through the filter in 2.6 minutes.

The experiment shows that the gelation solution containing crosslinking agent is sufficiently crosslinked to render it unfilterable. A gel that cannot pass through an 8 micron filter would not be expected to enter a competent formation matrix having a permeability below 1,000 md. Nonetheless, the gelation solution is highly pumpable after 1 hour of aging and capable of entering a void. Thus, the present gel is particularly suited for cement jobs. The gel enters voids and reduces the flow capacity of the voids, but does not enter the matrix and reduce matrix permeability. A further advantage of the present gel is that the greatest shear forces are usually encountered when the gelation solution is injected into the voids. Since the gel is highly pumpable at this point, it suffers little shear degradation.

EXAMPLE 22

% Hydrolysis: 30
Polymer MW: 11,000,000
Polymer Conc: 5,000
Polymer Solvent: Synthetic field injection water A*
Polymer pH: 7.5

| Run Number | 1 | 2 | 3 | 4 | 5 | 6 |
|---|---|---|---|---|---|---|
| Metal Ion Conc: | 214 | 143 | 107 | 214 | 143 | 107 |
| Total Ion Conc: | 826 | 552 | 415 | 826 | 552 | 415 |
| Weight Ratio Polymer:Ions: | 6.0 | 9.0 | 12.0 | 6.0 | 9.0 | 12.0 |
| Temp: | 22 | 22 | 22 | 43 | 43 | 43 |

*See Example 17 for composition.

The gelation solution is aged in a graduated cylinder for 48 hours. 50 additional milliliters of the PHPA solvent are added on top of the gel. The change in the position of the interface between the gel and the solvent in the graduated cylinder is recorded as a function of time.

| Run Number | 1 | 2 | 3 | 4 | 5 | 6 |
|---|---|---|---|---|---|---|
| Time | Change in Position of Interface (ml) | | | | | |
| 0.0 | 0 | 0 | 0 | 0 | 0 | 0 |
| 8.0 | 0 | 0 | +0.5 | 0 | 0 | +1 |
| 28 | 0 | 0 | 0 | 0 | 0 | 0 |
| 264 | 0 | 0 | +0.5 | 0 | 0 | 0 |
| 528 | +2.0 | +2.5 | +2.5 | +2 | 0 | −1 |

The gel of the present invention appears substantially resistant to water expulsion (syneresis) or swelling upon contact with additional formation water.

While the foregoing preferred embodiments of the invention have been described and shown, it is understood that the alternatives and modifications, such as those suggested and others, may be made thereto and fall within the scope of the invention.

I claim:

1. A primary cementing process for completion of a casing in a wellbore in fluid communication with a subterranean hydrocarbon-bearing formation below an earthen surface, comprising:
   (a) admixing a gelation solution at the surface consisting essentially of a water-soluble carboxylate-containing polymer, a complex capable of crosslinking said polymer and formed of at least one chromic species and at least one acetate species, and a solvent for said polymer and said complex;
   (b) injecting said gelation solution into a volume behind said casing in said wellbore; and
   (c) crosslinking said gelation solution to substantial completion in said volume to form a non-flowing crosslinked polymer cement gel which substantially cements said casing to the face of said wellbore.

2. The process of claim 1 wherein the weight ratio of said polymer to said complex in said gelation solution is about 2.5:1 to about 100:1.

3. The process of claim 1 wherein said carboxylate-containing polymer is an acrylamide polymer.

4. The process of claim 1 wherein said wellbore is an injection wellbore.

5. The process of claim 1 wherein said wellbore is a production wellbore.

6. A squeeze cementing process applied to a cased wellbore in fluid communication with a hydrocarbon-bearing formation below an earthen surface, the process comprising the steps of:
   (a) admixing a gelation solution at said earthen surface consisting essentially of a water-soluble carboxylate-containing polymer, a complex capable of crosslinking said polymer and formed of at least one chromic species and at least one acetate species, and a solvent for said polymer and said complex;
   (b) squeezing said gelation solution into a volume in said wellbore; and
   (c) crosslinking said gelation solution to substantial completion in said volume to form a non-flowing crosslinked polymer cement gel which substantially plugs said volume.

7. The process of claim 6 further comprising partially gelling said gelation solution before said solution contacts a less permeable subterranean material adjoining said volume such that said partially gelled gelation solution is flowing but is sufficiently gelled not to penetrate said material.

8. The process of claim 6 where said carboxylate-containing polymer is an acrylamide polymer.

9. The process of claim 6 wherein said volume is a void in a primary cement job in said wellbore.

10. A squeeze cementing process applied to a cased wellbore in fluid communication with a subterranean hydrocarbon-bearing formation below an earthen surface, the process comprising the steps of:
   (a) admixing a gelation solution at the surface consisting essentially of a water-soluble carboxylate-containing polymer, a complex capable of crosslinking said polymer and formed of at least one chromic species and at least one acetate species, and at least one species selected from the group consisting of electronegative oxygen species, electronegative hydroxide species, inorganic monovalent ions, inorganic divalent ions, water molecules, and mixtures thereof, and a solvent for said polymer and said complex;
   (b) squeezing said gelation solution into a volume in said wellbore; and
   (c) crosslinking said gelation solution to substantial completion in said volume to form a crosslinked polymer cement gel which substantially plugs said volume.

11. The process of claim 10 wherein said wellbore is a hydrocarbon production wellbore.

12. The process of claim 11 wherein said cement gel substantially reduces the water to hydrocarbon ratio of fluids produced from said wellbore.

13. The process of claim 10 wherein said wellbore is a fluid injection wellbore.

14. The process of claim 10 wherein said volume is a void in a primary cement job in said wellbore.

15. The process of claim 10 wherein said carboxylate-containing polymer is an acrylamide polymer.

16. A primary cementing process for completion of a casing in a wellbore in fluid communication with a subterranean hydrocarbon-bearing formation below an earthen surface, comprising:
   (a) admixing a gelation solution at the surface consisting essentially of a water-soluble carboxylate-containing polymer, a complex capable of crosslinking said polymer and formed of at least one chromic species, at least one acetate species, and at least one species selected from the group consisting of electronegative oxygen species, electronegative hydroxide species, inorganic monovalent ions, inorganic divalent ions, water molecules, and mixtures thereof, and a solvent for said polymer and said complex;
   (b) injecting said gelation solution into a volume behind said casing in said wellbore; and
   (c) crosslinking said gelation solution to substantial completion in said volume to form a non-flowing crosslinked polymer cement gel which substantially cements said casing to the face of said wellbore.

17. The process of claim 16 wherein said carboxylate-containing polymer is an acrylamide polymer.

18. The process of claim 16 wherein said wellbore is a fluid injection wellbore.

19. The process of claim 16 wherein said wellbore is a hydrocarbon production wellbore.

20. The process of claim 6 wherein said wellbore is a hydrocarbon production wellbore.

21. The process of claim 20 wherein said crosslinked polymer cement gel substantially reduces the water to hydrocarbon ratio of fluids produced from said wellbore.

22. The process of claim 6 wherein said wellbore is a fluid injection wellbore.

23. The process of claim 10 further comprising partially gelling said gelation solution before said solution contacts a less permeable subterranean material adjoining said volume such that said partially gelled gelation solution is flowing but is sufficiently gelled not to penetrate said material.

24. The process of claim 6 wherein said volume is a tubing leak in said wellbore.

25. The process of claim 10 wherein said volume is a tubing leak in said wellbore.

26. The process of claim 6 wherein the weight ratio of said polymer to said complex in said gelation solution is about 2.5:1 to about 100:1.

27. The process of claim 10 wherein the weight ratio of said polymer to said complex in said gelation solution is about 2.5:1 to about 100:1.

* * * * *

UNITED STATES PATENT AND TRADEMARK OFFICE
CERTIFICATE OF CORRECTION

PATENT NO. : 4,724,906

DATED : February 16, 1988

INVENTOR(S) : Robert D. Sydansk

It is certified that error appears in the above-identified patent and that said Letters Patent is hereby corrected as shown below:

Col. 1, line 48: Delete "the" and insert --to--.
Col. 2, line 17: After "penetrate" insert --and propagate--.
Col. 2, line 24: Delete "surfaced" and insert --surfaces--.
Col. 2, line 34: Delete "salinites" and insert --salinities--.
Col. 3, lines 37 & 38: Delete "Examplary" and insert --Exemplary--.
Col. 16, line 41: Delete "0.0" and insert --0.5--.

Signed and Sealed this

Thirteenth Day of September, 1988

Attest:

DONALD J. QUIGG

*Attesting Officer*  *Commissioner of Patents and Trademarks*